M. REYNOLDS.
INSECT ERADICATOR.
APPLICATION FILED SEPT. 8, 1916.
1,234,214.
Patented July 24, 1917.
2 SHEETS—SHEET 2.
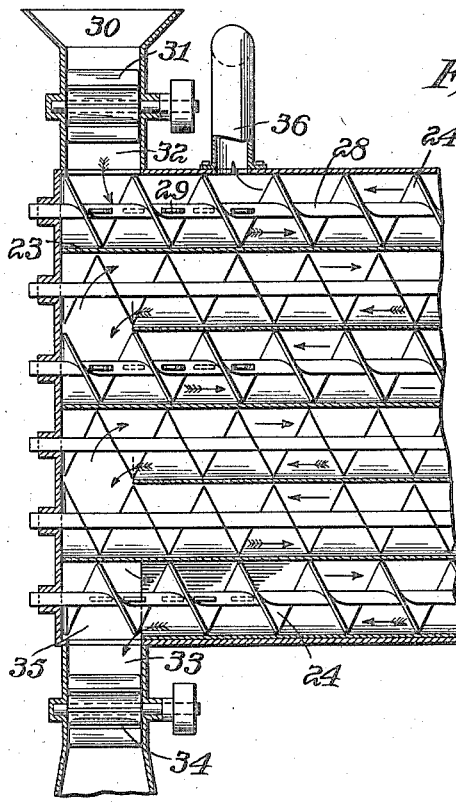
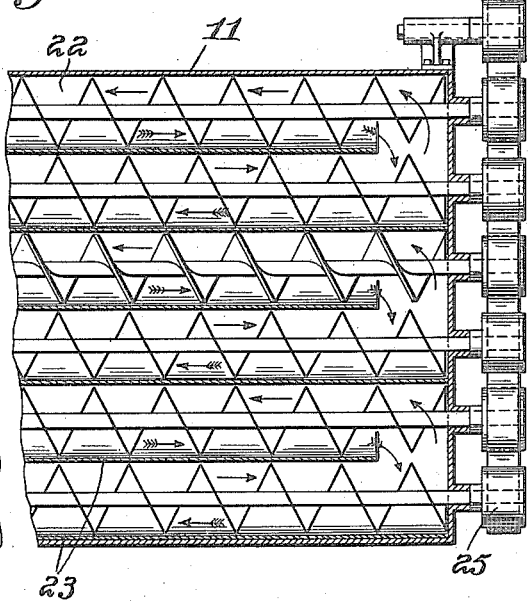
Fig. 2.
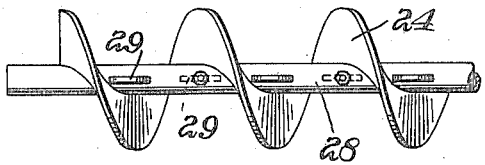
Fig. 4.
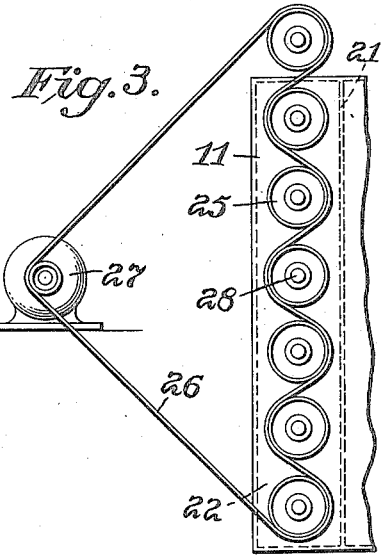
Fig. 3.
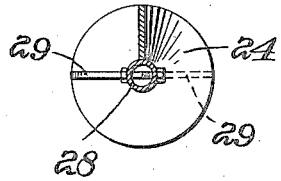
Fig. 5.
Inventor:
Mercer Reynolds,
by Spear, Middleton, Donaldson & Spear
Atty's.

UNITED STATES PATENT OFFICE.

MERCER REYNOLDS, OF ST. ELMO, TENNESSEE.

INSECT-ERADICATOR.

1,234,214.
Specification of Letters Patent.
Patented July 24, 1917.

Application filed September 8, 1916. Serial No. 119,112.

*To all whom it may concern:*

Be it known that MERCER REYNOLDS, a citizen of the United States, and resident of St. Elmo, Tennessee, have invented certain new and useful Improvements in Insect-Eradicators, of which the following is a specification.

This invention relates to a process for eradicating the Mexican boll weevil or its eggs from cotton seed prior to its use in an oil mill and its object is to permit the use of cotton seed from infected districts in mills in uninfected territory without danger of spreading the pest.

Cotton raising districts infested with the weevil are defined and charted by Government entomologists and an embargo is placed on the shipment of seed out of those districts. This works hardship and failure on certain cotton seed oil mills, because they are unable to get the necessary seed. So it was to overcome this condition that the present invention was designed. With it the seeds are treated so that danger of the pests spreading is completely eradicated, thereby making shipments of infected seed entirely safe.

The invention is illustrated in the accompanding drawings in which,

Fig. 2 is a transverse section on line 2—2 of Fig. 1.

Fig. 3 is a fragmental detail of the conveyer driving mechanism.

Figs. 4 and 5 show details.

Figure 1:
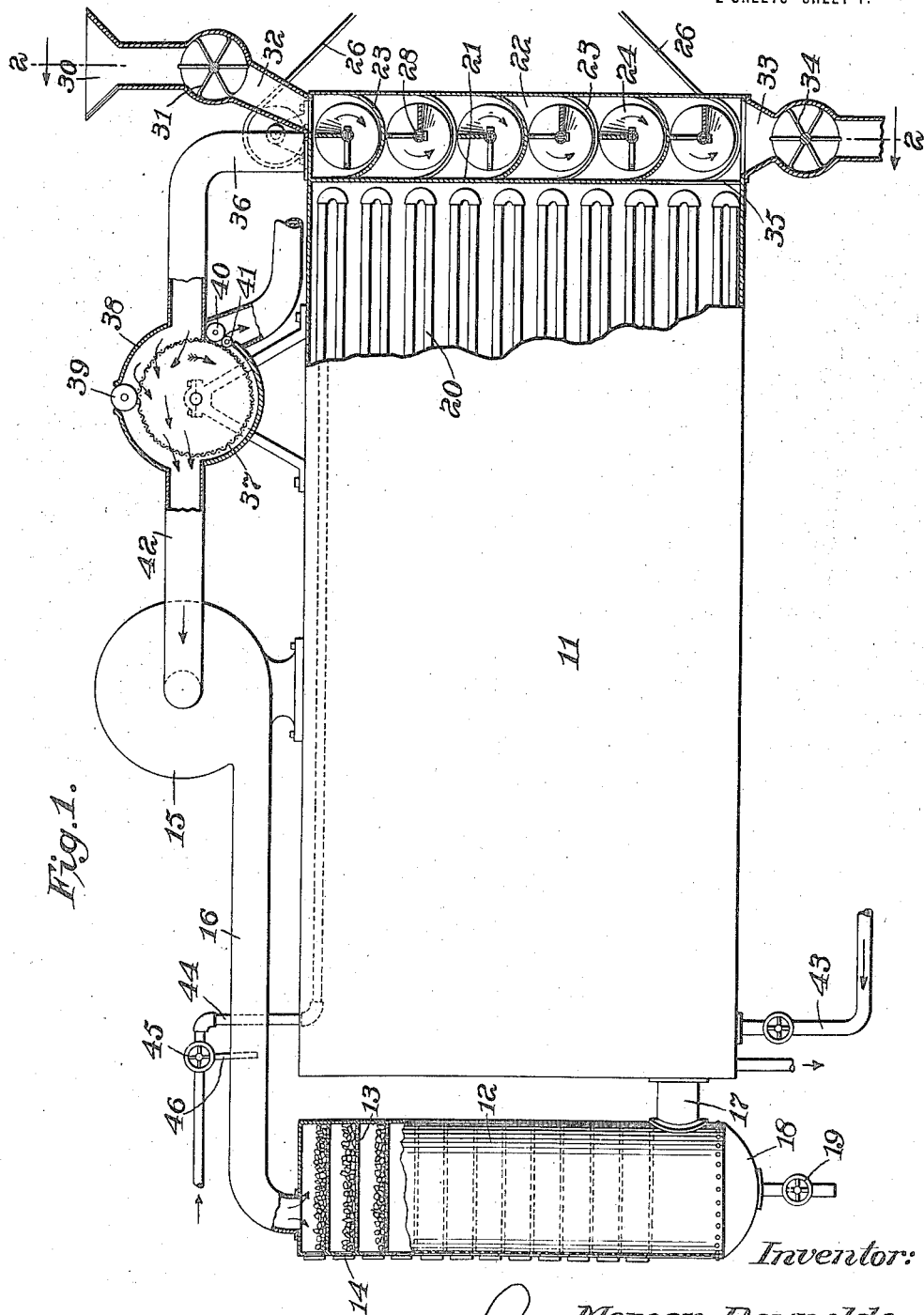
Figure 1 is a side elevation of my device partly in section.

In the drawings the numeral 11 indicates a large main air heating casing. 12 indicates an air drying member adjacent thereto comprising a cylindrical upright tank provided with a plurality of perforated plates or screens 13 horizontally located therein adapted to have moisture absorbing chemicals, such as caustic soda, placed thereon. 14 represent screw plugs or hand holes provided one for each plate or tray 13, through which the caustic may be inserted or extracted. 15 indicates a suitably driven blower, preferably supported upon the main casing 11 adapted to force air through the pipe 16 into and through the tank 12. As the air passes downward through the screens or trays 13 all moisture is taken from it. Pipe 17 permits it then to pass into the casing 11. The base 18 of the tank 12 is hemispherical to collect drip from the trays 13 and a valved pipe 19 is attached thereto for drawing off any liquid that may accumulate.

The casing 11 is filled with steam coils 20 for heating the air delivered into the casing from the drying tank. At the end of the casing opposite the drying tank 12 a partition 21 is provided, whereby a chamber 22 is formed in which the seed is treated.

This chamber has a plurality of concave superposed baffle plates 23 therein bridging the distance from side to side of the chamber 22 and alternately extending from opposite ends of the chamber longitudinally thereof. Located adjacent each plate 23 is a conveyer 24, preferably a screw conveyer, journaled in the walls of the chamber and provided with a driving pulley 25. These pulleys are driven by a belt 26 from a driven element, such as 27, the belt being arranged as indicated in Fig. 3 to drive alternate conveyers in opposite directions.

On the conveyer shafts 28 are provided small blades 29, as illustrated, to agitate the seed as they are being conveyed along.

At the top of the chamber 22 a seed inlet is provided which consists of a hopper 30 leading to a rotary gate 31 controlling a chute 32 from which the seeds fall to the top plate 23. A similar chute 33 and gate 34 is provided at the bottom of the chamber for the discharge of the treated seeds. 35 indicates an opening from the casing 11 to the chamber 22 through which the hot air is adapted to pass. From the top of the chamber 22 the air passes through the pipe 36 to a clearing element supported from the casing 11, which consists of a screen drum 37 suitably journaled and inclosed by a casing 38. A roller 39 is provided between the top of the drum and the casing to prevent passage of air around the drum instead of through it. The drum is adapted to extract all lint from the air and as the drum rotates the lint thereon is removed by the rollers 40 and 41, one large and the other small. From the drum, the air passes through pipe 42 to the blower 15 and completes another cycle as just described. 43 represents a valved pipe through which steam may be admitted to the air in the casing 11, if the air is too dry.

The operation of the device is as follows:

The trays 13 of the drier tank 12 are filled with caustic, the fan blower 15 started, steam turned into the coils 20, the conveyers 24 started and the cotton seeds are begun to be fed to the baffles 23 through the gate 31 and chute 32. The rotary gate prevents the escape of any air from the chamber 22. The conveyers 24 cause the grain to move along upon the baffle plates until they reach the ends thereof, whereupon they drop to the one below and so on. This continues until the seeds are discharged through the gate 34. During this movement of the seeds, they are subjected to the air which has been dried in the tank 12 and heated in the casing 11. This air enters the chamber 22 at the bottom and discharges therefrom, so that the direction of flow of the air is opposite to the movement of the seeds. The air is cleaned of lint by the drum 37 and then goes to the blower again.

It has been determined by W. Dwight Pierce of the Department of Agriculture that certain combinations of temperature and moisture are more quickly fatal to boll weevils than high or low temperatures alone, (see *Journal of Agricultural Research* Vol. V. No. 25, page 1186) so with this in mind, this device was designed where any combination could be obtained. The temperature can be regulated by the amount of steam admitted to the coils 20 and the moisture of the air can be regulated by first having it entirely dry and then adding moisture thereto by the steam pipe 43. Also the important advantage results of either drying or moistening the seeds while they are being treated by regulation of the moisture in the hot air or insecticide.

While this process and apparatus has been designed especially for the treatment of cotton seed I do not limit myself in this particular, as with slight, if any change, the apparatus may be utilized for the treatment of grains of many kinds, and may be found very desirable for such use.

If desired the steam inlet pipe 44 to the coils 20 may be provided with a valve 45 actuated by a thermostat 46 in the casing 11 to maintain a constant temperature in the casing.

What I claim is:—

An insect eradicator comprising a complete circuit for air with means for forcing the air through the circuit, means for drying the air, means for heating the same, conveyer means in the circuit for the passage of the material to be treated and means for filtering the air on its passage to the air forcing means.

In testimony whereof I affix my signature.

MERCER REYNOLDS.

Witnesses:
F. L. MIDDLETON,
BENNETT S. JONES.